US011276869B2

(12) United States Patent
Blanco et al.

(10) Patent No.: US 11,276,869 B2
(45) Date of Patent: Mar. 15, 2022

(54) HYDROGEN FUEL CELL STACK AND METHOD FOR UPGRADING A HYDROGEN FUEL CELL STACK

(71) Applicant: The Boeing Company, Chicago, IL (US)

(72) Inventors: José Antonio Blanco, Madrid (ES); Nieves Lapeña, Madrid (ES); Jose L. Lemus, Madrid (ES); Enrique Emilio Serrot Hauke, Madrid (ES); Eduardo G. Ferreyra, Madrid (ES)

(73) Assignee: The Boeing Company, Chicago, IL (US)

( * ) Notice: Subject to any disclaimer, the term of this patent is extended or adjusted under 35 U.S.C. 154(b) by 693 days.

(21) Appl. No.: 15/475,782

(22) Filed: Mar. 31, 2017

(65) Prior Publication Data

US 2017/0373332 A1    Dec. 28, 2017

(30) Foreign Application Priority Data

Jun. 23, 2016  (EP) ..................................... 16382290

(51) Int. Cl.
*H01M 8/04082*    (2016.01)
*H01M 8/0213*    (2016.01)
*H01M 8/0258*    (2016.01)
*H01M 8/2483*    (2016.01)
*H01M 8/0267*    (2016.01)
(Continued)

(52) U.S. Cl.
CPC ..... *H01M 8/04201* (2013.01); *H01M 8/0213* (2013.01); *H01M 8/0258* (2013.01); *H01M 8/0267* (2013.01); *H01M 8/04014* (2013.01);
*H01M 8/04029* (2013.01); *H01M 8/1018* (2013.01); *H01M 8/241* (2013.01); *H01M 8/2483* (2016.02); *H01M 2008/1095* (2013.01); *H01M 2250/20* (2013.01); *Y02T 90/40* (2013.01)

(58) Field of Classification Search
CPC ............. H01M 8/0258; H01M 8/0267; H01M 8/04014; H01M 8/04201; H01M 8/1018; H01M 8/2483; H01M 2008/1095
See application file for complete search history.

(56) References Cited

U.S. PATENT DOCUMENTS

2005/0244700 A1   11/2005   Abd Elhamid et al.
2006/0240308 A1   10/2006   Formanski et al.
(Continued)

OTHER PUBLICATIONS

"What Is Rotary Die Cutting?" ThomasNet®—Product Sourcing and Supplier Discovery Platform. Web. Accessed on: Nov. 19, 2018. <www.thomasnet.com/articles/custom-manufacturing-fabricating/rotary-die-cutting>.*
(Continued)

*Primary Examiner* — Maria Laios
(74) *Attorney, Agent, or Firm* — McDonnell Boehnen Hulbert & Berghoff LLP

(57) ABSTRACT

This disclosure relates to a hydrogen fuel cell stack with one or more hydrogen fuel cell (102) having in turn a proton exchange membrane (104), a hydrogen reaction layer (112) and an oxygen reaction layer (116) within a pair of bipolar plates (106). At least a bipolar plate (106) comprises a channel (108) inside for hydrogen inflow. Additionally, this disclosure relates to a method of upgrading a hydrogen fuel cell stack, said method comprising inserting a channel (108) for hydrogen inflow inside at least a bipolar plate (106).

19 Claims, 4 Drawing Sheets

(51) Int. Cl.
*H01M 8/04014* (2016.01)
*H01M 8/04029* (2016.01)
*H01M 8/1018* (2016.01)
*H01M 8/241* (2016.01)
*H01M 8/10* (2016.01)

(56) References Cited

U.S. PATENT DOCUMENTS

| | | | |
|---|---|---|---|
| 2007/0003815 A1 | 1/2007 | Vyas et al. | |
| 2008/0176114 A1 | 7/2008 | Oh et al. | |
| 2008/0248370 A1* | 10/2008 | Abd Elhamid | H01M 8/0228 |
| | | | 429/465 |
| 2009/0130500 A1* | 5/2009 | Wozniczka | H01M 8/04731 |
| | | | 429/457 |
| 2016/0372765 A1* | 12/2016 | Jones | H01M 8/04074 |

OTHER PUBLICATIONS

"Engrave." American Heritage Dictionary. Houghton Mifflin Harcourt Publishing Company. Web. Accessed on: Nov. 19, 2018. <www.ahdictionary.com/word/search.html?q=engrave>.*

European Search Report prepared by the European Patent Office in Application No. 16 38 2290.1 dated Sep. 14, 2016.

Office Action issued by the European Patent Office in Application No. 16 38 2290.1 dated Nov. 4, 2016.

* cited by examiner

HYDROGEN FUEL CELL STACK AND METHOD FOR UPGRADING A HYDROGEN FUEL CELL STACK

CROSS-REFERENCE TO RELATED PATENT APPLICATION

The present disclosure claims priority to EP patent application number 16382290.1, filed on Jun. 23, 2016, the entire contents of which are herein incorporated by reference.

FIELD

The present disclosure is encompassed within the field of fuel cells, and specifically to hydrogen fuel cell stacks.

This disclosure relates, in particular, to a hydrogen fuel cell stack with a channel for hydrogen inflow inside at least a bipolar plate of the stack. Additionally, this disclosure relates to a method of upgrading a hydrogen fuel cell stack which comprises inserting a channel for hydrogen inflow inside at least a bipolar plate of said stack in order to heat up the hydrogen gas boiled off from a cryogenic liquid state at very low temperature up to a usable temperature for the fuel cells in which the hydrogen inflow enters.

BACKGROUND

Liquid hydrogen is one of the most efficient ways to store hydrogen to be used to feed a fuel cell, as it has the highest energy density. However, it is not commonly used because of the costly surrounding infrastructure and certain specific technical challenges. These technical challenges become even larger when trying to use liquid hydrogen as fuel for fuel cell stacks in moving vehicles, especially in small aircraft and small unmanned aerial vehicles (UAVs), where weight and space limitations are particularly strict and the system efficiency becomes a mandatory design rule from the weight, space and energy points of view.

Fuel cell stacks have a certain number of single cells disposed physically and electrically in a serial configuration in order to achieve the desired voltage output level. The single cells are connected in between by bipolar plates, which are electrical conductors and are the cells serial connection. Additionally, these bipolar plates distribute both the hydrogen and oxygen to the single cells.

One of the technical challenges is the extremely low temperature of the hydrogen gas boiled off from liquid hydrogen, which needs to be raised prior to feeding it to the fuel cell stack. The temperature of the hydrogen needs to be increased from the ultra-low temperature 20 K up to a usable temperature for the fuel cell, which is a temperature above 273K and about 300 K, that is, a temperature in the range of room temperature. Such large temperature increase (approx. 270K from the liquid hydrogen tank to the fuel cell) requires a non-negligible high amount of energy in form of heat to be transferred to the hydrogen flow which is a function of the flow rate.

Nowadays there are different ways to supply such energy to the hydrogen used as fuel in vehicles. One option is heating the hydrogen with electrical heaters, which are small and light-weight, but they must be powered from an electrical power source, which would diminish the overall performance of the system by reducing the total usable energy of the fuel cell in the case of that power is taken from its output. The electrical heater could be also powered by an onboard battery, though in such case the situation could be even worse due to the battery weight and volume.

Other alternative option is heating the hydrogen through a heat exchanger outside the fuel cell which uses the flow coming from the fuel cell cooling system as a heat source, since fuel cells must normally be cooled down during operation, for which purpose they usually have a dedicated cooling blower. However, the heat exchanger is weight consuming and has a considerable volume, and the humidity of the air can condense and freeze on the surface of the heat exchanger forming undesirable ice. Alternatively, the heat exchanger could use the ambient temperature as a heat source to heat the hydrogen, but the heat exchanger will be even heavier and larger since it would have to deal with the lower temperatures of the ambient rather than with those of the fuel cell cooling system outflow, and the ice would appear earlier since the temperature of the ambient air used to heat the hydrogen is closer to its dew point (lower temperature). Additionally, this option would be subjected to the ambient temperature, and if the ambient temperature is not higher than the hydrogen target temperature, the latter will not ever be reached. This condition could be easily found while flying at altitudes above about 5000 ft. (1524 m), and always above about 7000 ft. (2133.6 m).

US2008/0176114 discloses a fuel cell system which includes a cooling water temperature raising unit that raises the temperature of a fuel stack by passing discharge gas of a process burner or hydrogen gas of a fuel processing unit and cooling water that is heated by the discharge gas of the process burner through flow paths formed on opposing surfaces of cooling separators formed of a metal and installed between a plurality of cells in the stack.

US2007/0003815 discloses a flow field plate or bipolar plate for a fuel cell including a combination of $TiO_2$ and a conductive material that makes the bipolar plate conductive, hydrophilic and stable in the fuel cell environment. The $TiO_2$ and the conductive material can be placed on the plate as separate layers or combined as a single layer.

US2005/0244700 discloses a hybrid bipolar plate assembly with a metallic anode plate, a polymeric composite cathode plate, and a metal layer between them. The anode and cathode plates can further comprise an adhesive sealant applied around the outer perimeter to prevent leaking of coolant. This assembly wan be incorporated into a device comprising a fuel cell.

US2006/0240308 discloses a fuel cell assembly with a flow distribution subassembly having four sets of flow channels. The first set faces an anode for distribution of a fuel reactant to said anode, the second set faces a cathode for distribution of an oxidant to said cathode, the third set is in flow communication with the second set and in heat transfer relation with at least one of the anode and cathode, and the fourth set receives a coolant different from the oxidant.

SUMMARY

The present disclosure provides a hydrogen fuel cell stack which has one or more hydrogen fuel cell. Each hydrogen fuel cell comprises in turn at least a Proton Exchange Membrane, a hydrogen reaction layer and an oxygen reaction layer within a pair of bipolar plates. According this fuel cell, hydrogen inflow reaches the hydrogen reaction layer, which is the anode, where protons H+ are released, passing through the proton exchange membrane to the oxygen reaction layer, which is the cathode, where they join to the oxygen generating water.

According the present disclosure, at least one of the bipolar plates comprises a channel inside for hydrogen inflow, in order to heat up the hydrogen gas boiled off from a cryogenic liquid state at very low temperature (about 20K) up to a usable temperature (about 273K-300K) for the fuel cell in which the hydrogen inflow enters. This channel inside the bipolar plate may have different shapes and length, and it acts as a heat exchanger, so the hydrogen inflow will be heated up before entering the hydrogen reaction layer, taking advantage of the heat generated in the fuel cells themselves and accumulated in the bipolar plates, without the need for an external heating source.

According to a preferred embodiment, the channel for the hydrogen inflow is made within a first layer which contacts the hydrogen reaction layer of the hydrogen fuel cell.

Alternatively, the channel for the hydrogen inflow is made within a second layer which contacts the oxygen reaction layer of the hydrogen fuel cell.

In accordance to an embodiment alternative to the previous ones, the channel for the hydrogen inflow is directly engraved within the bipolar plate.

Preferably, the hydrogen reaction layer comprises a plurality of distribution ducts.

For the same reasons, the oxygen reaction layer preferably has a plurality of distribution ducts.

With accord to a particular embodiment, the oxygen reaction layer comprises a plurality of cooling grooves.

According to a preferred embodiment, the channel for the hydrogen inflow of the present disclosure is related to the fuel consumption of an aircraft fuel system. Since the hydrogen flow to be heated is the same of that being consumed by the cell, the channel for the hydrogen inflow has the same section of the distribution ducts of the hydrogen reaction layer.

Regarding the material, the bipolar plates are made of any electrical conductor material. According to a particular embodiment the bipolar plates are made of graphite.

Additionally, the present disclosure provides a method of upgrading a hydrogen fuel cell stack, which comprises inserting a channel for hydrogen inflow inside at least one of the bipolar plates of the fuel cell stack.

With accord to a preferred embodiment of the method, it comprises inserting a first layer with the channel for hydrogen inflow contacting the hydrogen reaction layer of the hydrogen fuel cell.

According an alternative particular embodiment of the method, it comprises inserting a second layer with the channel for hydrogen inflow contacting the oxygen reaction layer of the hydrogen fuel cell.

Alternatively, a particular embodiment of the method comprises engraving the channel for hydrogen inflow directly within the bipolar plate.

The present disclosure provides a robust integration for the heat exchanger because it is self-sustained by the fuel cell structure itself, providing full structural integrity.

The features, functions and advantages that have been discussed can be achieved independently in various embodiments or may be combined in yet other embodiments further details of which can be seen with reference to the following description and drawings.

BRIEF DESCRIPTION OF THE DRAWINGS

Next, in order to facilitate the comprehension of this disclosure, in an illustrative rather than limitative manner a series of embodiments with reference to a series of figures shall be made below.

Figure 1:
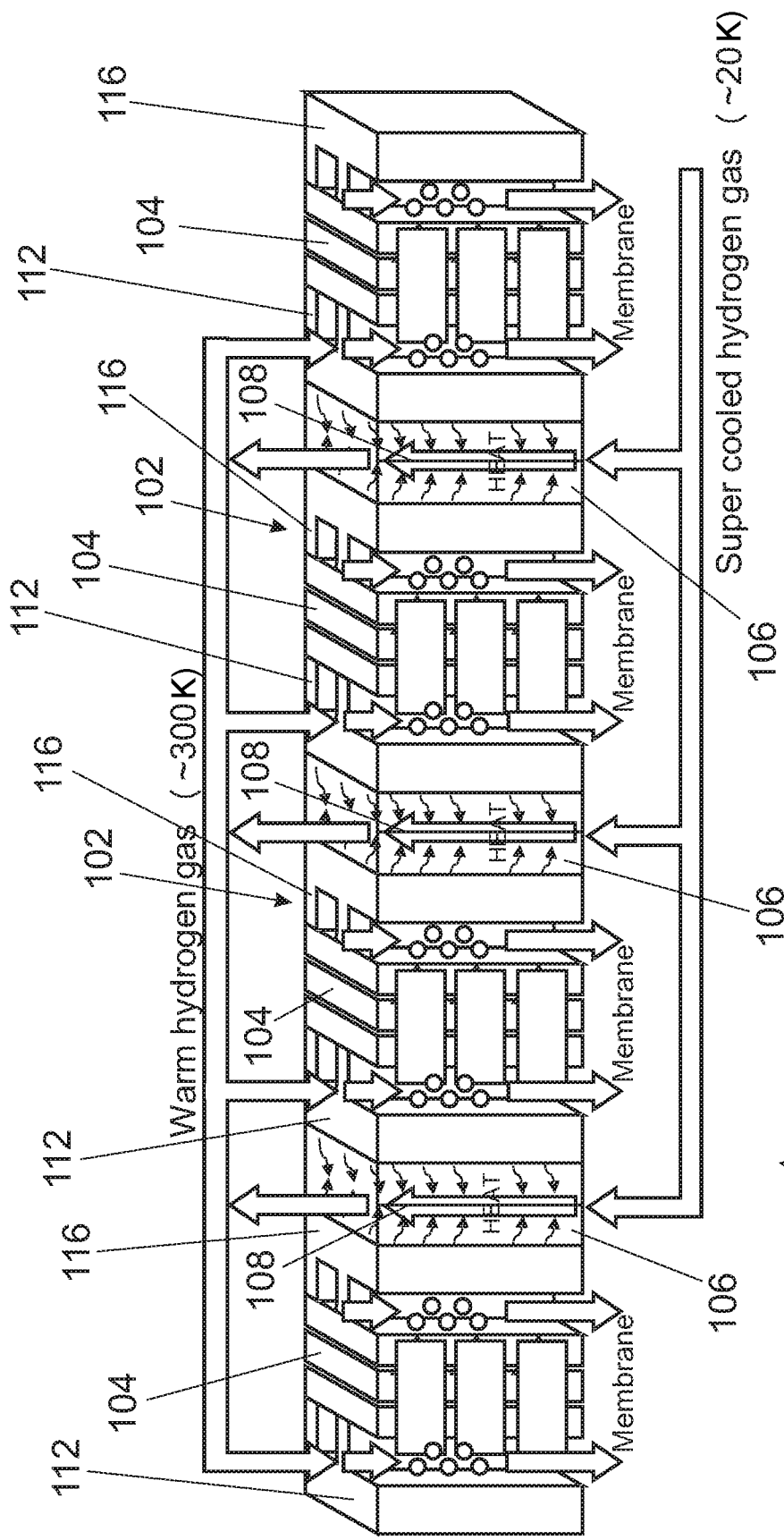
FIG. 1 is a schematic view of an exemplary embodiment of a fuel cell stack showing its main elements.

These Figures Refer to the Following Set of Elements:
100. hydrogen fuel cell stack
102. hydrogen fuel cell
104. proton exchange membrane
106. bipolar plates
106a, 106b parts of the bipolar plates
108. Channel
110. first layer for the channel
112 hydrogen reaction layer
116 oxygen reaction layer
118 distribution ducts of the hydrogen and oxygen reaction layers
120 cooling grooves of the oxygen reaction layer

DETAILED DESCRIPTION

The present disclosure refers to a hydrogen fuel cell stack 100 which comprises one or more hydrogen fuel cell 102. Each one of these hydrogen fuel cells 102 comprises in turn at least a Proton Exchange Membrane (PEM) 104, a hydrogen reaction layer 112 and an oxygen reaction layer 116 within a pair of bipolar plates 106. The hydrogen reaction layers 112 are the anodes and the oxygen reaction layers 116 are the cathodes of the fuel cells 102.

As it can be seen in FIG. 1 at least a bipolar plate 106 comprises a channel 108 inside for hydrogen inflow, in order to heat up the hydrogen gas boiled off from a cryogenic liquid state at a very low temperature (about 20K) up to a usable temperature (about 273K-300K) for the fuel cell in which the hydrogen inflow enters. This channel 108 inside the bipolar plate 106 may have different shapes and length, and it acts as a heat exchanger, so the hydrogen inflow will be heated up before entering the hydrogen reaction layer 112, taking advantage of the heat generated in the fuel cells 102 themselves and accumulated in the bipolar plates 106, without the need for an external heating source.

This channel 108 inside the bipolar plates 106 acting as a heat exchanger increase the hydrogen inflow temperature before reaching the hydrogen reaction layer 112. So, this heat exchanger or slim gas heating circuit increase the hydrogen inflow temperature with the minimum weight and volume increase of the overall system while using the, otherwise lost, heat dissipated by the fuel cells 102 through the bipolar plates 106, minimizing the power self-consumption of the system, therefore making it as efficient as possible.

Then, the channel 108 of the present disclosure is a light-weight and compact heat exchanger integrated into the fuel cell 102 body, which takes advantage of the low viscosity and the great thermal conductivity of hydrogen.

Unlike existing solutions, which need a dedicated and external heat exchanger being volume and weight consuming, in the present disclosure the heat exchanger is inside the bipolar plates 106, so the heat exchange may be considered the fuel cell 102 itself and no substantial volume increase is expected.

Moreover, since the channel 108 or heat exchanger is located inside a heat source (the bipolar plate 106), the heat for heating up the hydrogen inflow does not need to be ducted to an external heat exchanger, avoiding fans, ducts, wiring, piping, fittings or certain valves with the corresponding weight and volume thereof. Additionally, this leads to a simpler system with many fewer components.

Another advantage of the present disclosure is that undesirable icing of the already existing solutions is avoided by heating the overcooled hydrogen inflow in a high temperature environment, as that existing in the fuel cells 102 core, specifically the bipolar plates 106 (about 323K), being such temperature far away from the dew point of any water vapour flow that could be around.

Additionally, as the heat exchanger is enclosed inside the hydrogen fuel cell stack 100, only clean hydrogen is in contact with the channel 108 or heat exchanger, therefore no heat exchanger cleaning or maintenance is necessary.

Furthermore, reduced cooling of the fuel cells 102 is needed. Since the fuel cell 102 dissipates half of the total power produced in form of heat, this heat must be removed from the cell 102 by means of the cell's cooling system as already existing. However, using some of this heat (around 10%) for a useful purpose, which is the heating of the hydrogen inflow, the cooling system requirements decrease, allowing lighter and smaller fans and less power needed for them. So, the channel 108 provides sufficient heating of the hydrogen and useful cooling of the fuel cell 102.

Although this disclosure is specifically described here for Proton Exchange Membrane (PEM) fuel cell stacks, it can be used with any kind of fuel cells couple to a liquid hydrogen system.

Figure 2:
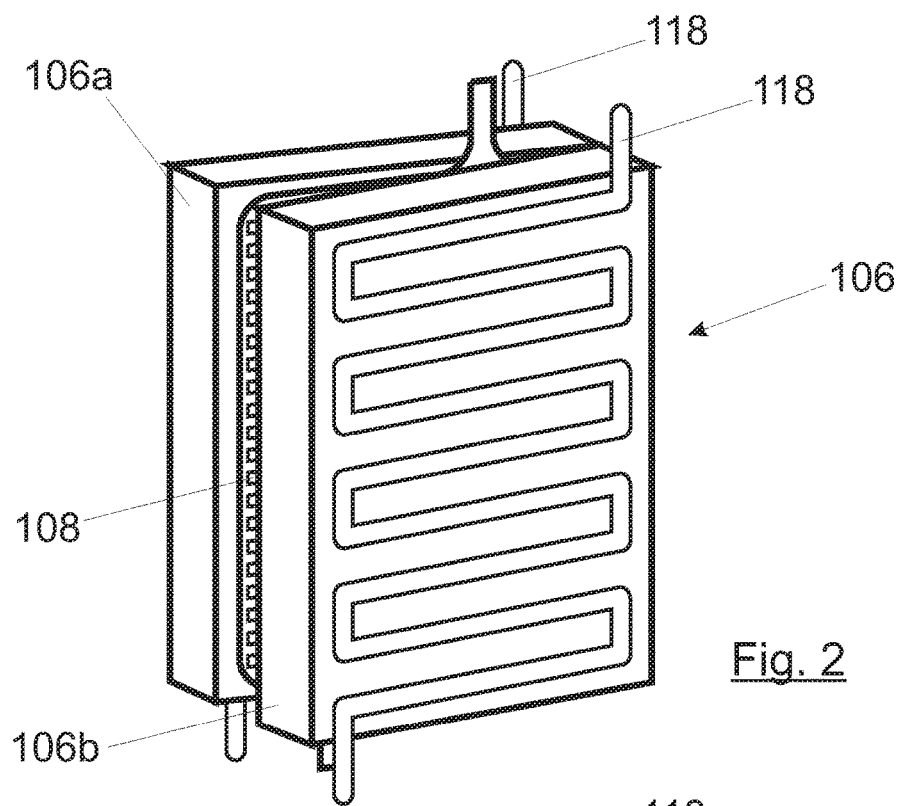
FIG. 2 shows one of the bipolar plates of the fuel cell stack of FIG. 1 split for the inclusion of a channel according a particular embodiment.
Figure 3:
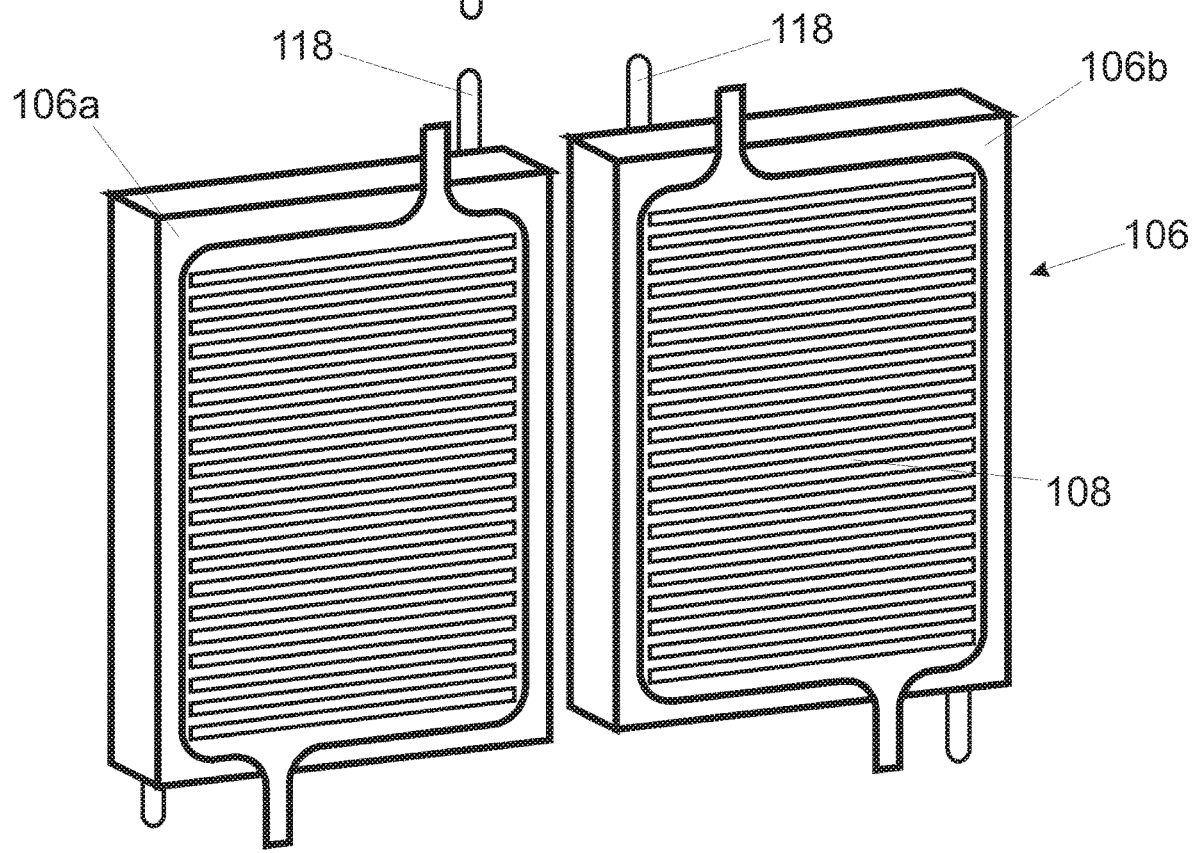
FIG. 3 shows the two parts of the bipolar plate of FIG. 2 with the channel according a particular embodiment.

FIGS. 2 and 3 show a particular embodiment in which the channel 108 for the hydrogen inflow is engraved directly within the bipolar plate 106. This channel 108 or heat exchanger is machined directly within the bipolar plates 106 and no additional parts are expected, neither appreciable weight nor volume increase, since the channel 108 is integrated into the fuel cell 102 mainly by removing material in existing parts. For such purpose the bipolar plates 106 are firstly split in two parts 106a and 106b and then the channel 108 is engraved directly on one of the parts 106a or 106b or on both parts 106a and 106b which will be connected together again forming the bipolar plate 106 with the channel 108 inside.

Accordingly, some components such as sealing joints or some small piping will be needed, although the will add very low weight in any case and even lower when compared to an external dedicated heat exchanger.

In this case, as the heat exchanger channels 108 are engraved directly inside the fuel cell 102, the resulting structural integrity of the heat exchanger is even greater.

Figure 4:
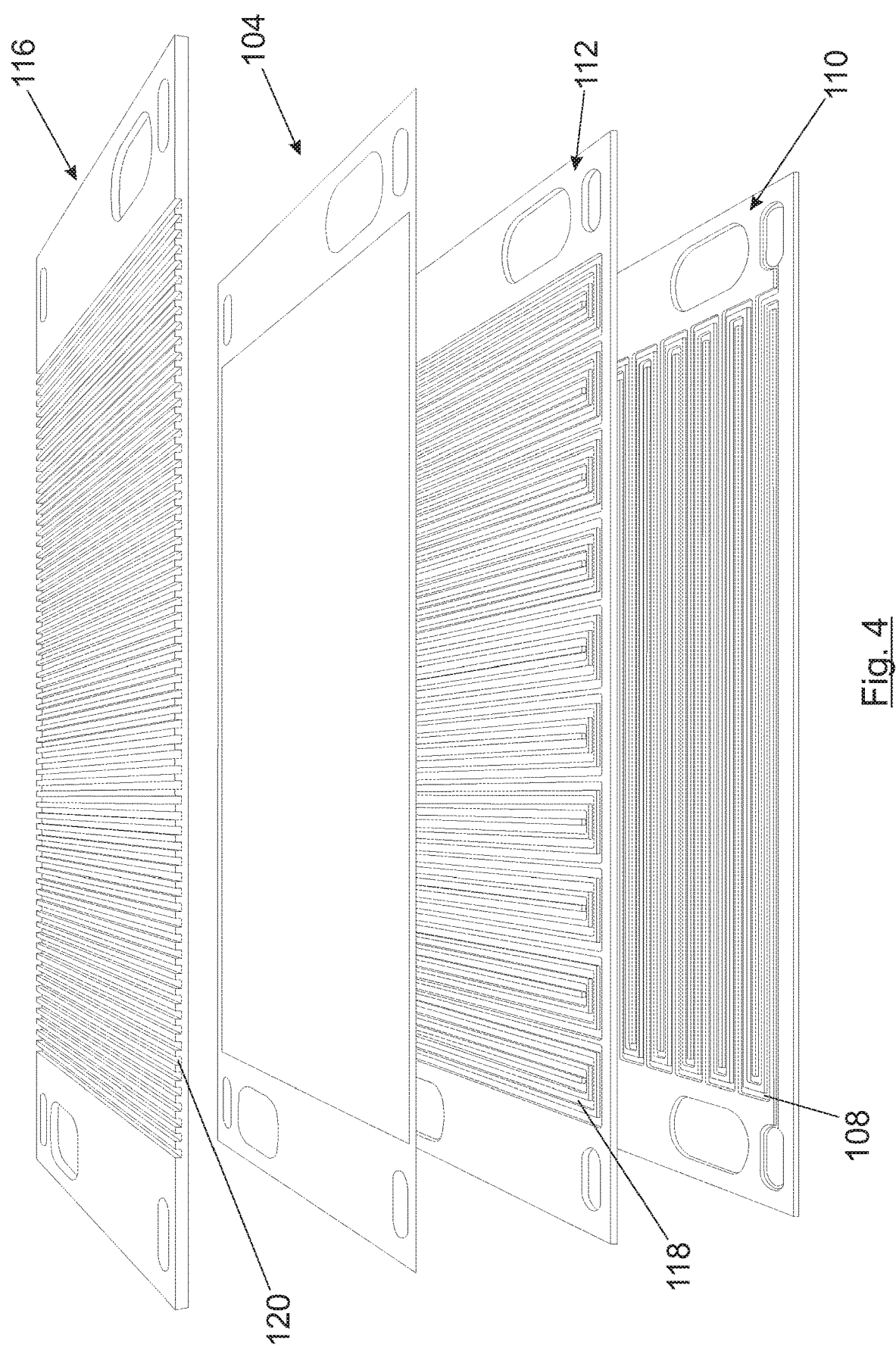
FIG. 4 shows a top-perspective view of an exemplary embodiment of the main layers of a fuel cell including a first layer including the channel contacting the hydrogen reaction layer.
Figure 5:
FIG. 5 shows a bottom-perspective view of the embodiment of the main layers of the fuel cell of FIG. 4.

Alternatively, FIGS. 4 and 5 show a particular embodiment in which the channel 108 for the hydrogen inflow is made within a first layer 110, the first layer 110 contacting the hydrogen reaction layer 112 or anode of the hydrogen fuel cell 102. In order to include the first layer 110 with the channel 108, the depth of the bipolar plate 106 might have to be reduced.

As an alternative embodiment not shown in the figures, the channel 108 for the hydrogen inflow is made within a second layer, the second layer contacting in this case the oxygen reaction layer 116 of the hydrogen fuel cell 102. Similarly, in order to include the second layer with the channel 108, the depth of the bipolar plate 106 might have to be reduced.

With accord to a preferred embodiment, the oxygen reaction layer 116 comprises a plurality of cooling grooves 120 for the cooling of said oxygen reaction layer 116, being the cooling fluid flowing through the cooling grooves 120 typically air or water.

In accordance with a particular embodiment, the hydrogen reaction layer 112 or anode comprises a plurality of distribution ducts 118 for the distribution of the hydrogen all along the entire surface of the Proton Exchange Membrane (PEM) 104.

According with other particular embodiment, the oxygen reaction layer 116 or cathode has a plurality of distribution ducts 118 for the distribution of the oxygen all along the entire surface of the cathode, and additionally so that the entering air drags the generated water outside the fuel cell 102.

Moreover, preferably both hydrogen reaction layer 112 and oxygen reaction layer 116 have distribution ducts 118 for the complete distribution of hydrogen and oxygen, in order to provide a uniform reaction over the surface of the membrane.

According to an exemplary embodiment, the channel 108 for the hydrogen inflow of the present disclosure is related to the fuel consumption of an aircraft fuel system. Since the quantity of hydrogen flow to be heated is substantially the same as the quantity of hydrogen being consumed by the cell, the channel 108 for the hydrogen inflow has approximately the same cross-sectional area as the distribution ducts 118 of the hydrogen reaction layer 112. More specifically, the channel 108 and the distribution ducts 118 are each sized such that, in operation, the quantity of hydrogen flowing through the channel 108 is approximately equal to the quantity of hydrogen flowing through the distribution ducts 118.

Regarding the materials, the bipolar plates 106 are made of any electrical conductor material. According to a particular embodiment the bipolar plates 106 are made of graphite.

Additionally, the present disclosure relates to a method of upgrading a hydrogen fuel cell stack, the method comprising inserting a channel 108 for hydrogen inflow inside at least a bipolar plate 106.

According a preferred embodiment, the method comprises inserting a first layer 110 with the channel 108 for hydrogen inflow, the first layer 110 contacting the hydrogen reaction layer 112 of the hydrogen fuel cell 102.

With accord to an alternative embodiment, the method comprises inserting a second layer with the channel 108 for hydrogen inflow, the second layer contacting in this case the oxygen reaction layer 118 of the hydrogen fuel cell 102.

Alternatively, a particular embodiment of the method comprises engraving the channel 108 for hydrogen inflow directly within the bipolar plate 106.

For such purpose, in a first step of the method the bipolar plates 106 are split in two parts. Then, in a second step of the method the channel 108 is engraved directly on one of the parts or on both parts of the bipolar plate 106. Finally, in a third step both parts of the split bipolar plate 106 are connected together again forming the bipolar plate 16 with the channel 108 inside.

The invention claimed is:

1. A hydrogen fuel cell stack comprising one or more hydrogen fuel cells comprising (i) a Proton Exchange Membrane, and (ii) a bipolar plate split into a first part and a second part, wherein a hydrogen reaction layer configured for receiving an hydrogen inflow is included on an outside of the first part, and an oxygen reaction layer is included on an outside of the second part, the hydrogen fuel cell stack characterized in that the first part and the second part comprises an engraving inside such that connecting the first part and the second part forms a channel inside the bipolar plate via the engraving inside the first part and the second part, wherein the channel is connected to the hydrogen inflow of the hydrogen reaction layer.

2. The hydrogen fuel cell stack of claim 1, wherein the channel connected to the hydrogen inflow is made within a first layer, said first layer contacting the hydrogen reaction layer of the hydrogen fuel cell.

3. The hydrogen fuel cell stack of claim 1, wherein the channel connected to the hydrogen inflow is made within a second layer, said second layer contacting the oxygen reaction layer of the hydrogen fuel cell.

4. The hydrogen fuel cell stack of claim 1, wherein the channel for the hydrogen inflow is engraved within the bipolar plate.

5. The hydrogen fuel cell stack of claim 1, wherein the hydrogen reaction layer comprises a plurality of distribution ducts.

6. The hydrogen fuel cell stack of claim 5, wherein the channel connected to the hydrogen inflow has the same cross-sectional area as the distribution ducts of the hydrogen reaction layer.

7. The hydrogen fuel cell stack of claim 1, wherein the oxygen reaction layer comprises a plurality of cooling grooves.

8. The hydrogen fuel cell stack of claim 1, wherein the oxygen reaction layer comprises a plurality of distribution ducts.

9. The hydrogen fuel cell stack of claim 1, wherein the bipolar plate is made of graphite.

10. A hydrogen fuel cell stack comprising:
   one or more hydrogen fuel cells comprising:
      a Proton Exchange Membrane;
      a bipolar plate split into a first part and a second part;
      a hydrogen reaction layer configured for receiving an hydrogen inflow included on an outside of the first part of the bipolar plate; and
      an oxygen reaction layer included on an outside of the second part of the bipolar plate,
   wherein the first part and the second part comprises an engraving inside such that connecting the first part and the second part forms a channel inside the bipolar plate via the engraving inside the first part and the second part, wherein the channel is connected to the hydrogen inflow of the hydrogen reaction layer, the channel comprising an inlet configured for receiving super cooled hydrogen gas and an outlet connected to the hydrogen inflow.

11. The hydrogen fuel cell stack of claim 10, wherein the hydrogen reaction layer is an anode and the oxygen reaction layer is a cathode of the hydrogen fuel cell.

12. The hydrogen fuel cell stack of claim 10, wherein at least one of the hydrogen reaction layer and the oxygen reaction layer comprises a plurality of distribution ducts.

13. The hydrogen fuel cell stack of claim 10, wherein the oxygen reaction layer comprises a plurality of cooling grooves.

14. The hydrogen fuel cell stack of claim 10, wherein the channel connected to the hydrogen inflow is made within a first layer, said first layer contacting the hydrogen reaction layer of the hydrogen fuel cell.

15. The hydrogen fuel cell stack of claim 10, wherein the channel connected to the hydrogen inflow is made within a second layer, said second layer contacting the oxygen reaction layer of the hydrogen fuel cell.

16. The hydrogen fuel cell stack of claim 10, wherein the channel for the hydrogen inflow is engraved within the bipolar plate.

17. The hydrogen fuel cell stack of claim 10, wherein the hydrogen reaction layer comprises a plurality of distribution ducts.

18. The hydrogen fuel cell stack of claim 17, wherein the channel connected to the hydrogen inflow has the same cross-sectional area as the distribution ducts of the hydrogen reaction layer.

19. The hydrogen fuel cell stack of claim 10 wherein the bipolar plate is made of graphite.

* * * * *